Patented Apr. 22, 1952

2,593,852

UNITED STATES PATENT OFFICE 2,593,852

PENICILLIN AMIDES

Douglas E. Cooper, Syracuse, N. Y., assignor to Bristol Laboratories Inc., a corporation of New York No Drawing. Application November 16, 1949, Serial No. 127,803

10 Claims. (Cl. 260—239.1)

This invention relates to new derivatives of penicillin and more particularly to penicillin amides and methods for producing such compounds.

The term "penicillin" is used to describe a group of isotelic carboxylic acids having the probable formula

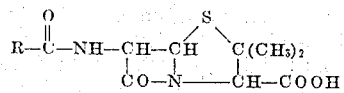

for which many R groups are known including benzyl, p-hydroxy benzyl, p-chlorobenzyl, Δ-2-pentenyl, n-heptyl and n-amyl. Penicillin is generally used in the form of a metal salt of the carboxylic acid group but may also be obtained in the form of ammonium or substituted ammonium salts. Variations in the nature of the R group are accompanied by well-known variations in the anti-biotic activity of the resulting penicillins. These variations, however, are of a relatively minor order of magnitude as is illustrated by the following table:

TABLE I

| | Approximate activity (units/mg.) against | |
|---|---|---|
| | Staph. aureus | B. subtilis |
| Penicillin X | 900 | 1,100 |
| Penicillin G | 1,667 | 1,667 |
| Penicillin F | 1,500 | 1,000 |
| Penicillin K | 2,300 | 750 |

Various penicillin esters have been prepared and studied.

Ungar, Lancet, March 15, 1947, page 331.
Cavallite et al., Science 102, 150 (1945).
Meyer et al., Science 97, 205 (1943).
Meyer, Proc. Soc. Exptl. Biol. 53, 100 (1943).
Richardson et al., Proc. Soc. Exptl. Biol. 60, 272 (1945).
Broh-Kahn and Smith, Proc. Soc. Exptl. Biol. 61, 216–220 (1946).
Ungar, Brit. Jour. Exp. Path. 28, 88–93 (1947).

These esters include the methyl, ethyl, n-butyl, benzhydryl, and benzyl. It has been reported, however, that these esters have little or no antibiotic activity per se, being active only when converted by hydrolysis into the carboxylate ion (i. e., penicillin). Although this hydrolysis occurs in the bodies of some animals, such has not been found to be the case with humans. The penicillin esters so far prepared and studied, consequently, are useless as therapeutic agents for man.

In none of the prior art dealing with penicillin has any antibiotically active derivative of the carboxyl group been reported. Furthermore, there has existed no general method for the preparation of carboxyl derivatives of penicillin with the exception of the use of the diazomethanes to prepare the esters of penicillin listed above.

It has been discovered, however, that new types of derivatives of the carboxyl group of penicillin can be prepared and that these derivatives possess antibiotic activity per se as well as other important and unexpected properties as are discussed more fully below and in copending applications United States Serial Nos. 777,113, filed September 30, 1947, and 115,110, now U. S. Patent 2,577,699, of which this application is a continuation-in-part. These derivatives of the carboxyl group of penicillin are the amides of penicillin.

More specifically, the product of this invention is an amide of penicillin and a compound of the formula R—NH$_2$, where R is a member selected from the group consisting of hydrogen, monocyclic cycloalkyl, di(lower)alkylamino(lower)-alkyl, hydroxy(lower)alkyl, alpha-carboxy-(lower)alkyl, and beta-(sulfonic acid)(lower)-alkyl. The so-called classes or sub-groups such as hydrogen, monocyclic cycloalkyl, etc. which compose this group are represented in the examples below by the species of penicillin amides prepared from ammonia, cyclohexylamine, dimethylaminopropylamine, ethanolamine, glycine, and taurine respectively.

These amides of penicillin may be prepared by allowing an anhydride of penicillin to react with ammonia or an amine. This reaction is carried out in a solvent, inert toward the reactants and products, but in which both reactants are soluble. Suitable solvents include chloroform, acetyl diethylamine, dimethylformamide and acetyl dimethylamine. The use of chloroform as a solvent is most desirable when amorphous grades of penicillin are used as starting materials for preparing the anhydride. When, however, pure crystalline penicillin G is employed in lieu of the amorphous grades the low solubility thereof in chloroform makes this solvent less desirable. It is preferred to employ acetyldimethylamine as the solvent for carrying out the reaction since this is an excellent solvent for sodium penicillin G and, in addition, is miscible with water and many organic solvents.

The reaction may be carried out at room temperature, or a lower or higher temperature. The reactive and unstable nature of penicillin, however, makes it desirable to avoid excessively high temperatures and it is preferred to carry out the reaction within the temperature range of 0° C. to 30° C.

The amides of penicillin comprising the invention herein may be prepared from various anhydrides or mixed anhydrides of penicillin G. The anhydrides disclosed in co-pending applications United States Serial Nos. 777,113 and 115,110 may be employed; such as, for example, penicillin G acetyl anhydride, diphenylacetyl penicillin G anhydride, diphenylpropionyl penicillin G anhydride, mixed penicillin G phenylacetyl anhydride, mixed penicillin G benzoyl anhydride, penicillin dodecanoyl anhydride, penicillin trichloroacetyl anhydride and penicillin octadecanoyl anhydride. It is preferred to employ penicillin G acetyl anhydride which may be prepared by adding 0.3 ml. acetyl chloride, drop by drop with swirling, to a solution of 1 g. of sodium penicillin G in 10 ml. of acetyldimethylamine cooled to 5° C. Sodium chloride rapidly precipitates; and, after five minutes further standing, the solution is poured into 100 ml. cold neutral phosphate buffer. The anhydride separates as a white solid which becomes gummy after it has separated and is allowed to come to room temperature. For use in reactions for preparing amides of penicillin it may then be extracted with chloroform or ether or it can be used in its original solution in acetyldimethylamine or other solvent. After a chloroform solution containing the anhydride has been thoroughly washed with buffer, the activity remaining in the chloroform is due to penicillin acetyl anhydride. The preparation of other anhydrides and mixed anhydrides of penicillin is fully described in the above mentioned copending application.

The anhydrides or mixed anhydrides of penicillin G are allowed to react with ammonia or amines to form the amides of penicillin as described above. Among the amines which may be employed are cyclohexylamine, dimethylaminopropylamine, glycine, taurine, sodium glutamate, morpholinoethylamine and ethanolamine.

The simple, unsubstituted amide of penicillin, represented by PenCONH$_2$, is prepared by reacting a mixed anhydride of penicillin, for example, acetyl penicillin anhydride, with ammonia:

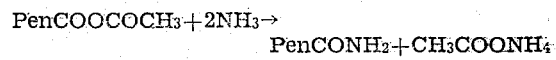

PenCOOCOCH$_3$ + 2NH$_3$ →
PenCONH$_2$ + CH$_3$COONH$_4$

This reaction can be carried out using a solution of ammonia in a non-aqueous solvent, but I prefer adding the anhydride to an alkaline buffered aqueous solution of an ammonium salt such as diammonium phosphate. This contains sufficient ammonia to promote the reaction, and the substantially insoluble amide product precipitates as it is formed.

Penicillin G amide is white, crystalline solid which may be obtained, as from the above reaction, in the form of a trihydrate, or in an anhydrous form, melting at 161° C. The latter form is transformed into the trihydrate by contact with water. This compound is tasteless, odorless, and is slightly soluble in water. Like the other amides and esters described herein, it is most conveniently assayed by the iodometric procedure, (Alicino, Ind. Eng. Chem., Anal. Ed., 18, 619 (1946)), by means of which the sensitive betalactam moiety characteristic of the penicillin structure is shown to be fully intact, the molecule not reacting with iodine before mild treatment with alkali, but consuming the 8.5 atoms iodine per molecule characteristic of the penicillin structure, after treatment.

By the *Staphylococcus aureus* agar plate assay it shows only 11% of the activity of an equimolecular amount of penicillin. The bacteriological spectrum is significantly shifted from that of penicillin, although the amide appears to show penicillin's characteristic inactivity toward the Gram-negative bacteria group. A remarkable difference from penicillin is the amide's very much greater activity against the virulent type penicillin-resistant strains of staphylococcus. Indeed, the amide appears to make no great distinction between these and the normal strains of this organism. Another unexpected property of the amide is a substantially complete resistance to destruction by penicillinase. The pathogenic resistant strains are known to produce penicillinase, but it has never been demonstrated that this enzyme was the sole factor in their penicillin resistance, but these observations strongly indicate this may be true. The resistance of penicillin amides to penicillinase suggests other interesting possibilities with respect to mixed infections where non-pathogenic secondary invaders often produce penicillinase in quantity sufficient to render penicillin therapy futile. There are also other practical situations in which penicillinase effectively reduces or nullifies the value of penicillin therapy.

Thus, the amide of penicillin G showed a very different bacterial spectrum from that of the common penicillin G salts and, for example, showed greater activity against mycobacteria species than sodium penicillin G. A solution of the amide was found to be extremely resistant to attack by penicillinase, an enzyme which rapidly attacks all of the known isotelic penicillins and degrades them to compounds having no antibiotic activity. However, a solution of the amide was found to possess antibiotic activity in the presence of penicillinase, inhibiting the growth of a strain of Staphylococcus aureus.

It was further discovered that the amide possessed remarkable activity against a strain of Staphylococcus aureus which had been found to have resistance to sodium penicillin at a concentration 150 times as great as the normal inhibiting concentration of sodium penicillin (the amide was as effective against this resistant strain as it was against the normal strain of *Staphylococcus aureus*). An aqueous suspension of the amide was administered to rabbits by intramuscular injection. For a period of several hours thereafter, a measurable level of antibiotic activity was found in the blood serum of the animals.

The amides of penicillin are absorbed into the blood stream after either intramuscular injection or oral feeding. It has been shown to be non-toxic in mice even at the maximum levels physically practical to administer.

A greater water or serum solubility than that possessed by penicillin amide is desirable in some therapeutic applications. This property is conferred by replacing ammonia by an amine containing a solubilizing group. Examples of such amines are glycine, aminoethanol, and dimethylaminopropylamine. Most of the amides derived from such substituted amines are less active biologically than the simple amide, but are individually valuable therapeutically because of the wide range of physical characteristics they afford.

In the examples that follow the amides were made from penicillin G. The compounds may, however, be prepared from the other penicillin types.

*Example 1.—Penicillin amide.*—This compound may be prepared by adding isopropanolic ammonia to either a chloroform or acetyldimethylamine solution of an anhydride. It is more convenient not to isolate the anhydride, but to use it in the form of the solution in which it was originally prepared. A solution in acetyldimethylamine was used in the following typical experiment.

A cold (5°) solution of 150 grams sodium penicillin in 1000 ml. dimethylacetamide $$(CH_3CON(CH_3)_2)$$

was mechanically stirred and treated by a rapid addition of 33 ml. acetylchloride. After addition was complete the solution was stirred for five minutes longer, and a saturated solution of ammonia in isopropanol was added slowly with stirring until a small sample on dilution with water was neutral and remained neutral a full minute. Dilution of this reaction mixture to 8 liters with neutral phosphate buffer gave a clear solution, which was then stored in a refrigerator over night to destroy any excess anhydride. The solution was extracted three times with 800 ml. portions of chloroform. The extracts were combined, washed with buffer and then water. This solution, mixed with 500 ml. buffer to maintain neutrality and also to furnish water for hydration, was stirred and slowly diluted with 7200 ml. methyl cyclohexane. The crystalline trihydrate of penicillin amide slowly separated, finally forming a thick slurry solid. The solid was filtered, then washed with water and dried in the air; yield—85 g. (If any anhydride is present because of incomplete reaction, the precipitate will be oily, and also the pH of the buffer will fall. The pH should be checked frequently during the addition, and dilute ammonium hydroxide should be used to maintain neutrality. The oily precipitate should then be separated by decantation of the buffer and allowed to stir with an adequate amount of fresh buffer at room temperature over night to hydrolyze the anhydride and free the solid amide.)

The trihydrate was dissolved in a minimum amount, about 2,000 ml., of slightly warm chloroform (35° C.), washed with neutral buffer, and then filtered. It was then precipitated as before by pouring the solution into 3 volumes of methyl cyclohexane in the presence of buffer; yield—69 g. white needles, M. P. 65° C.; assay by the iodometric method, 1530 units per mg. The crystals show a 22° C. extinction angle; they appear to be indefinitely stable in air, but rapidly become isotropic if dried in vacuo. The crystalline anhydrous form can be obtained by dissolving the anhydrous amide, from drying the trihydrate in vacuo, in a small amount of acetone and diluting with benzene to the saturation point of the oily phase. Small rods showing parallel extinction and a melting point of 161° slowly separate. This form also seems indefinitely stable in air, but is quickly transformed to the trihydrate in contact with liquid water. Analysis: Calculated for the trihydrate: C, 49.6; H, 6.50; N, 10.9; $H_2O$, 14.1. Found: C, 49.7; H, 6.38; N, 10.9; $H_2O$, 14.0. Calculated for anhydrous form: C, 57.6; H, 5.74; N, 12.6. Found: C, 57.8; H, 5.83; N, 12.2.

The anhydrous form is soluble in most of the common organic solvents except the saturated hydrocarbons, but in the presence of moisture it forms the trihydrate which will separate from benzene or ether. The solubility of the trihydrate in water is slightly less than 1 mg. per ml.

The stability of the solid trihydrate at room temperature is excellent. Its neutral aqueous solutions show approximately the same stability as sodium or calcium penicillin solutions, while acid or alkali inactivates it rapidly as in the case of penicillin. Methanol is destructive, but propylene glycol solutions show a practical degree of stability. The remarkable resistance of penicillin amide to penicillinase was evidenced by the fact that a solution containing 100 iodometric units (about .07 mg.) and 200 units (Schenley) of penicillinase in 22 ml. neutral buffer required 28 hours for 50% inactivation, which rate of degradation is common for a penicillin solution containing no penicillinase whatever. In contrast, a solution which was identical except that the amide was replaced by 7800 units of sodium penicillin showed less than 5% of its original activity when assayed against *S. aureus* only 15 minutes after preparation.

*Example 2.—Penicillin cyclohexylamide.*—A cold solution of 1 g. sodium penicillin G in 10 ml. of acetyldimethylamine was treated as above with 0.3 ml. of acetyl chloride. Thirty drops of cyclohexylamine were then added with stirring. After the solution had come to room temperature and stood 10 minutes it was poured into 100 ml. of buffer and allowed to stand 1 hour. The precipitate was filtered off, washed with water and dried in vacuo; yield, 80 mg.; M. P. 172° (dec.); iodometric assay, 745 units per mg.; by *S. aureus*, 23 units per mg.; theoretical iodometric assay, 1440 units per mg. The low iodometric result is attributed to incomplete reaction caused by the insolubility of this derivative.

| Analysis | Calculated | Found |
|---|---|---|
| C | 63.6 | 63.3 |
| H | 7.0 | 7.4 |

*Example 3. — Gamma-dimethylaminopropylamide of penicillin.*—A solution of penicillin acetyl anhydride in acetyldimethylamine was prepared from 1 g. sodium penicillin in the usual way. Dimethylaminopropylamine (0.2 ml.) was added drop by drop with swirling of the chilled solution. After ten minutes the solution was poured into a cold mixture of 100 ml. buffer and 50 ml. methylamyl acetate. The mixture was then acidified with a predetermined amount (3.5 ml.) of diluted (10X) 85% phosphoric acid, and shaken well, producing a pH of 2.5 in the aqueous phase. After the penicillin-containing organic layer had been separated the cold aqueous solution was neutralized (pH 7.0) was a predetermined volume (11.5 ml.) of 1N sodium hydroxide. Assays showed this solution to contain 504,000 units, or 30% of the original iodometric activity. Extraction in the cold at pH 9.0 with methyl amyl acetate, followed by re-extraction at pH 4.0 into aqueous solution, successfully separated the derivative from residual traces of penicillin, although it entailed substantial losses by inactivation. The final extract was brought to neutrality with dilute sodium hydroxide. Assays showed the solution to contain 91,000 iodometric units of the amide. As assayed against *S. aureus* or agar plates, it contained 12,000 units. This assay ratio of 0.13 established the identity of a new derivative having the beta lactam linkage characteristic of penicillin still intact, yet substantially less active than sodium penicillin against the staphylococcus organism or agar plates. Lyophilization of the aqueous solution gave a white, somewhat hygroscopic solid, containing the new derivative with an admixture of some inorganic phosphate. The antibiotic is useful in this form.

*Example 4.—Penicillin G tauride (sodium 2 - benzylpenicillinamidoethane sulfonate).* — A mixed anhydride is prepared from 1.2 ml. isobutyryl chloride added to 3 grams sodium penicillin in 30 ml. cold dimethylformamide, letting the solution stand a few minutes. This is added in one minute to a solution of 5.3 grams taurine in 70 ml. 5% sodium carbonate, at room temperature, and the whole immediately neutralized with phosphoric acid and chilled. Wash twice with chloroform to remove dimethylformamide, then wash twice in the cold at pH 2.5 with equal volumes of ether to remove penicillin, acidifying as necessary with phosphoric acid, finally extract twice with 100 ml. portions of butanol.

The sulfonic acid derivative is extracted from the combined butanol solutions with two 150 ml. portions of water and sufficient 5% sodium bicarbonate to produce a pH of 7. The combined solutions of the sodium tauride derivative are then lyophilized, producing a very fine white powder. Yield: about 2.5 grams. Potency: 250–300 iodometric units per mg. The product contains some therapeutically inert sodium isobutyrate as a diluent.

*Example 5.—Penicillin G morpholinoethylamide (N-(2-morpholinoethyl) benzylpenicillinamide phosphate).*—A cold solution of 1 gram sodium penicillin in 10 ml. dimethylformamide is treated with 0.4 ml. isobutyryl chloride. After 5 minutes this is added to a prepared solution of 6 ml. morpholinoethylamine in 25 ml. water, previously adjusted to pH 8 with phosphoric acid, and stirred at room temperature. After 1 minute, dilute to 200 ml. with neutral 2% phosphate buffer, and extract with an equal volume of chloroform. The separated chloroform is washed twice with buffer to remove dimethylformamide, and is then evaporated in vacuo in the presence of 100 ml. neutral 3% phosphate buffer. If any insoluble oil remains, it can be readily taken into solution by reducing the pH to 6 with phosphoric acid and possibly diluting somewhat with water. The resulting clear solution lyophilizes to a fluffy white powder. Yield: about 3.5–4.0 grams. Potency: approximately 120 iodometric units per mg. The pure amine phosphate has a "potency" of 1100 units per mg., but the product from this procedure contains inert and harmless phosphate as a stabilizing diluent.

*Example 6.—Penicillin G glycide (sodium benzylpenicillinamidoacetate).*—Isobutyryl chloride (6 ml.) is added to a cold solution of 22 grams sodium penicillin in 100 ml. dimethylformamide, and the solution stirred 5 minutes. Finely powdered glycine (4.4 grams) is added, and then 10 ml. dry pyridine. Vigorous stirring in the cold is continued until dilution of a sample with neutral buffer produces a clear solution. The reaction mixture is then extracted with two 50 ml. portions of cold ether with acidification to pH 2.5. The combined ether extracts are then extracted with 500 ml. water, adding sufficient 10% potassium hydroxide to produce a pH of 7.5. Assay of the aqueous extract shows it contains approximately 30 million "units" iodometrically, this representing both the glycide derivative (salt) and penicillin.

The by-product penicillin can then be eliminated by adding 100,000 units (Schenley) penicillinase "A," and allowing the solution to stand overnight. (In order to avoid an undesirable increase in acidity it is advisable to add 400 ml. 5% phosphate neutral buffer before enzyme treatment.)

The derivative, now freed from penicillin, is then extracted into cold ether from acid solution as before, and taken from the ether back into neutral aqueous solution with the requisite amount of sodium hydroxide. Lyophilization gives a white solid product containing the desired product mixed with some pharmacologically and bacteriostatically inert by-product salts.

The yield is about 10 million iodometric "units," corresponding to 7 grams pure sodium penicillin glycide (1420 units/mg).

*Example 7.—Penicillin G ethanolamide (2-benzylpenicillinamidoethanol).*—Add 1.6 ml. of isobutyryl chloride to a cold solution of 4 grams sodium penicillin G in 40 ml. dimethylformamide, and let stand 10 minutes. This solution is then stirred into a room temperature solution of 32 ml. ethanolamine in 100 ml. water, previously adjusted to pH 8.2 using phosphoric acid. After 1 minute dilute to 2000 ml., using neutral phosphate buffer, and extract with two 1000 ml. portions of chloroform.

The chloroform solutions are washed, dried, then concentrated to a small volume under reduced pressure in the presence of 150 ml. neutral 2% phosphate buffer. The remaining chloroform is removed by a bubbling air stream, and the aqueous solution then lyophilized. Yield: about 4.0–4.5 grams.

The product may be hygroscopic, but moistening it with a little water, followed by scratching should induce it to crystallize, whereupon it can be dried again in vacuo to a less hygroscopic form. The product will contain from 50–75% of inert phosphates as a harmless diluent. The amount of active material is readily determined by iodometric assay, which should be about 400–500 units per mg. Partly because of a greatly lowered diffusion rate this derivative exhibits only 2% of the activity shown by penicillin on agar plates against *S. aureus.*

I claim:
1. Penicillin G amide.
2. Penicillin G cyclohexylamide.
3. Gamma-dimethylaminopropylamide of penicillin G.
4. Process of reacting penicillin G acetyl anhydride with ammonia to produce penicillin G amide.
5. Process of reacting penicillin G acetyl anhydride with cyclohexylamine to produce penicillin G cyclohexylamide.
6. Process of reacting penicillin G acetyl anhydride with dimethylaminopropylamine to produce gamma-dimethylaminopropylamide of penicillin G.
7. An amide of penicillin and a compound of the formula R—NH$_2$, where R is a member selected from the group consisting of hydrogen, monocyclic cycloalkyl, di(lower)alkylamino(lower)alkyl, hydroxy(lower)alkyl, alpha - carboxy(lower)alkyl, and beta-(sulfonic acid) (lower)-alkyl.
8. The process of reacting an anhydride of penicillin and a monocarboxylic acid with a compound of the formula R—NH$_2$, where R is a member selected from the group consisting of hydrogen, monocyclic cycloalkyl, di(lower)alkylamino(lower)alkyl, hydroxy(lower)alkyl, alpha-carboxy(lower)alkyl, and beta-(sulfonic acid) (lower)alkyl, to produce an amide of penicillin.
9. The process of reacting an anhydride of penicillin and a monocarboxylic acid in acetyl- dimethylamine as a solvent with a compound of the formula R—NH$_2$, where R is a member selected from the group consisting of hydrogen, monocyclic cycloalkyl, di(lower)alkylamino(lower)alkyl, hydroxy(lower)alkyl, alpha-carboxy-(lower)alkyl, and beta-(sulfonic acid) (lower)-alkyl to produce an amide of penicillin.

10. The process of reacting an anhydride of penicillin G and a monocarboxylic acid in acetyldimethylamine as a solvent with a compound of the formula R—NH$_2$, where R is a member selected from the group consisting of hydrogen, monocyclic cycloalkyl, di(lower)alkylamino(lower)alkyl, hydroxy(lower)alkyl, alpha-carboxy-(lower)alkyl, and beta-(sulfonic acid) (lower)-alkyl to produce an amide of penicillin G.

DOUGLAS E. COOPER.

REFERENCES CITED

The following references are of record in the file of this patent:

Merck Report CMR–M–15b, published (1947), Mar. 31, 1944, p. 2.

Cooper et al.: J. Am. Chem. Soc., vol. 70, Nov. 1948, pp. 3966–3977.